(12) United States Patent
Lee et al.

(10) Patent No.: US 8,582,892 B2
(45) Date of Patent: Nov. 12, 2013

(54) METHOD AND APPARATUS FOR FACE DETERMINATION

(75) Inventors: Isaac Lee, Daejeon (KR); Seung-yun Lee, Hwaseongi-si (KR); Byoung-kwon Lee, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 492 days.

(21) Appl. No.: 12/880,309

(22) Filed: Sep. 13, 2010

(65) Prior Publication Data
US 2011/0064313 A1 Mar. 17, 2011

(30) Foreign Application Priority Data
Sep. 14, 2009 (KR) .................. 10-2009-0086667

(51) Int. Cl.
*G06K 9/64* (2006.01)
(52) U.S. Cl.
USPC ............. 382/217; 348/78; 348/148; 348/349; 382/218; 396/123

(58) Field of Classification Search
USPC .................... 382/118, 217; 348/78, 148, 349; 396/121, 123
See application file for complete search history.

(56) References Cited

U.S. PATENT DOCUMENTS

| | | | |
|---|---|---|---|
| 7,912,363 B2* | 3/2011 | Minato et al. ................. | 396/123 |
| 8,145,049 B2* | 3/2012 | Hirai et al. .................... | 396/123 |
| 8,264,531 B2* | 9/2012 | Jung et al. ...................... | 348/78 |
| 8,269,879 B2* | 9/2012 | Sugimoto ..................... | 348/349 |
| 2008/0278587 A1* | 11/2008 | Izawa ....................... | 348/207.11 |

* cited by examiner

*Primary Examiner* — Gregory M Desire
(74) *Attorney, Agent, or Firm* — Drinker Biddle & Reath LLP

(57) ABSTRACT

Provided are a method and an apparatus for processing digital images, and more particularly, a method and an apparatus for face determination, wherein it is determined if a subject is a true subject based on distance information regarding a distance to the subject and face detection information. In an embodiment, the face detecting apparatus is a digital image processing apparatus and includes a digital signal processor for determining if a subject is a true subject based on distance information regarding a distance to the subject and face length information.

15 Claims, 9 Drawing Sheets $H_{real}$ : FACE LENGTH OF ACTUAL SUBJECT $H_{image}$ : FACE LENGTH OF DISPLAYED SUBJECT $H_{real} = H_{image} \times D/f$ DISTANCE BETWEEN ACTUAL SUBJECT AND LENS(D) 50 (cm)

ACTUAL SUBJECT

DISPLAYED FACE LENGTH : 20 (mm)

$H_{real} = H_{image} \times D/f$
$= 20 \text{ (mm)} \times 500 \text{ (mm)} / 50 \text{ (mm)}$
$= 200 \text{ (mm)}$ HERE,
$H_{min} = 250 \text{ (mm)}$
$H_{max} = 400 \text{ (mm)}$ SINCE CALCULATED FACE SIZE IS SMALLER THAN $H_{min}$,
IT IS DETERMINED THAT EXAMINED FACE
IS NOT FACE OF ACTUAL SUBJECT DISTANCE BETWEEN ACTUAL SUBJECT AND LENS(D) 100 (cm)

ACTUAL SUBJECT

DISPLAYED FACE LENGTH : 20 (mm)

$H_{real} = H_{image} \times D/f$
$= 20 \text{ (mm)} \times 1000 \text{ (mm)} / 70 \text{ (mm)}$
$= 285 \text{ (mm)}$ HERE,
$H_{min} = 250$ (mm)
$H_{max} = 400$ (mm)

SINCE CALCULATED FACE SIZE IS BETWEEN $H_{min}$ AND $H_{max}$, IT IS DETERMINED THAT EXAMINED FACE IS FACE OF ACTUAL SUBJECT

STORAGE UNIT (51)

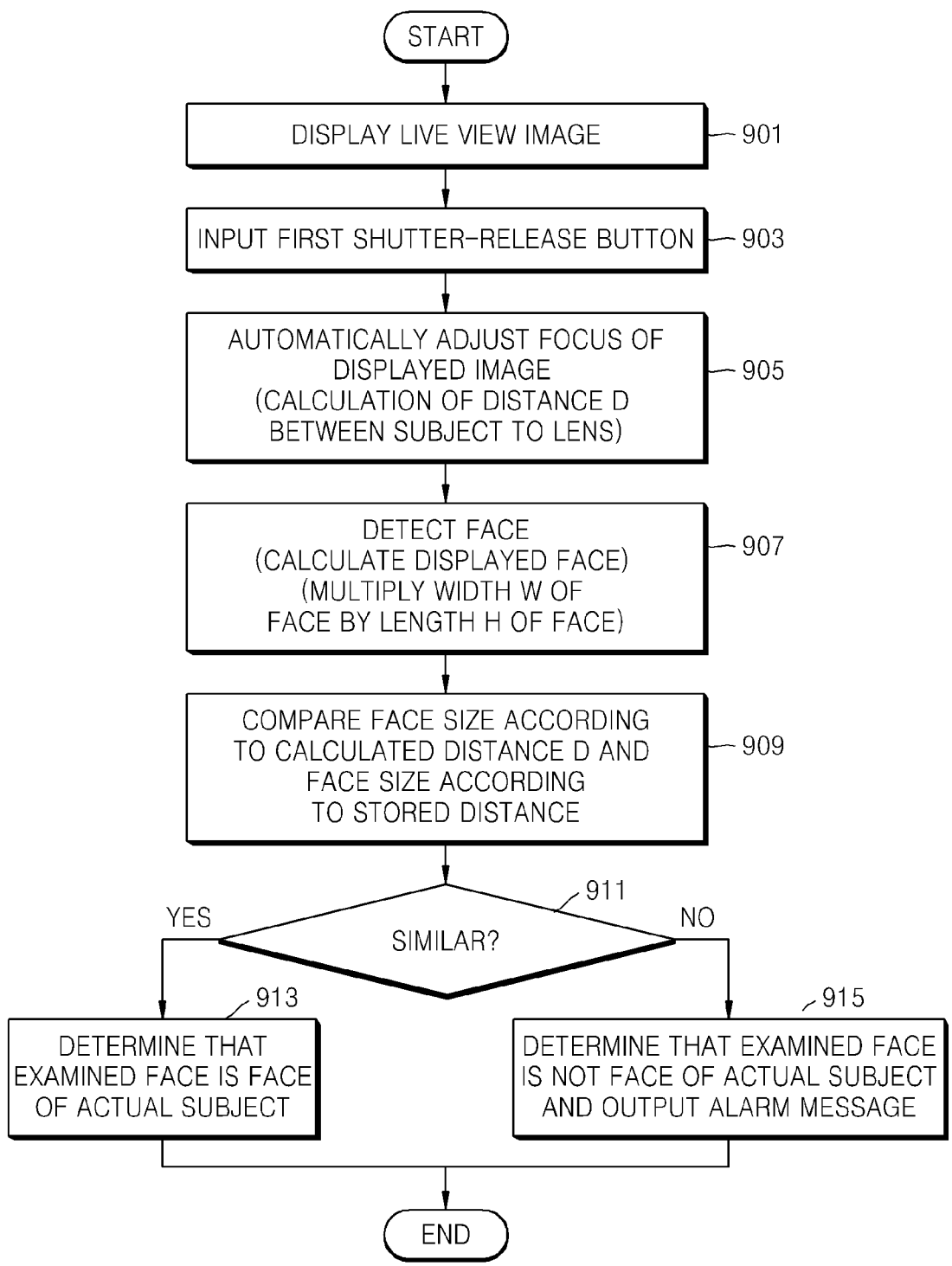

METHOD AND APPARATUS FOR FACE DETERMINATION

CROSS-REFERENCE TO RELATED PATENT APPLICATION

This application claims the benefit of Korean Patent Application No. 10-2009-0086667, filed on Sep. 14, 2009, in the Korean Intellectual Property Office, the disclosure of which is incorporated herein in its entirety by reference.

BACKGROUND

Various embodiments of the invention relate to a method and an apparatus for processing digital images, and more particularly, to a method and an apparatus for face determination, wherein it is determined whether a subject is a true subject or not based on distance information regarding a distance to the subject and face detection information.

General face detection techniques store characteristics of faces in a database and determine a face if characteristics of a face in live view images that are input in real time match the characteristics of faces in the database. In this case, even when a non-face pattern including similarities with the characteristics stored in the database is input as a live view image, the non-face pattern is detected as a face.

SUMMARY

Various embodiments of the invention provide a method and an apparatus for face determination, wherein it is determined whether a subject is a true subject or not based on distance information regarding a distance to the subject and face detection information to reduce erroneous face detections.

According to an embodiment of the invention, there is provided a face detecting apparatus, which is a digital image processing apparatus, including a digital signal processor for determining whether a subject is a true subject or not based on distance information regarding a distance to the subject and face length information.

The digital signal processor may include a focus adjusting unit for adjusting a focus of a live view image and calculating a distance between the subject and a lens; a face detection unit for detecting a face from the live view image with adjusted focus, calculating the length of the detected face, and calculating an actual length of the detected face based on a distance between the subject and the lens, the calculated length of the face, and a focusing distance; and a control unit for determining whether the subject is a true subject or not by comparing the calculated actual length of the face and a pre-stored face length reference value.

The face detecting apparatus may further include a storage unit for storing at least one of each of face detection information, a minimum face length reference value based on experiments, and a maximum face length reference value.

The face detecting apparatus may further include an informing unit for outputting an informing signal indicating that the subject is not a true subject in the case where it is determined that the subject is not a true subject based on the comparison.

The informing signal may be either a pop-up message or a voice message.

According to another embodiment of the invention, there is provided a face detecting apparatus, which is a digital image processing apparatus, including a digital signal processor for determining whether a subject is a true subject or not by comparing based on distance information regarding a distance to the subject and face size information to distance information regarding a distance to the subject and face size information stored in a database.

The digital signal processor may include a storage unit for storing at least one of each of face detection information and information regarding face sizes according to the distances; a focus adjusting unit for adjusting a focus of a live view image and calculating a distance between a subject and a lens; a face detection unit for calculating the size of a face from the live view image with adjusted focus; and a control unit for determining that the detected face corresponds to a true subject, in the case where face sizes according to the distances, the face sizes stored in the database are similar to the calculated face sizes according to the distances.

The face detecting apparatus may further include an informing unit for outputting an informing signal indicating that the subject is not a true subject in the case where it is determined that the subject is not a true subject based on the comparison.

The informing signal may be either a pop-up message or a voice message.

According to another embodiment of the invention, there is provided a method of operating a digital image processing apparatus, the method including steps of (a) calculating information regarding a distance to a subject and face length information; and (b) determining whether the subject is a true subject or not by using the calculated information.

The step (a) may include steps of (a-1) calculating a distance from the subject to a lens; (a-2) detecting a face from a live view image and calculating the length of the detected face; and (a-3) calculating an actual face length by using the distance from the subject to the lens, the calculated face length, and a focusing distance.

The step (b) may include steps of (b-1) comparing the calculated actual face size and pre-stored minimum/maximum face length reference values; and (b-2) determining whether the subject is a true subject or not based on a result of the comparison.

The method may further include a step of outputting an informing signal to inform that the subject is not a true subject in the case where it is determined that the subject is not a true subject.

The informing signal may be either a pop-up message or a voice message.

According to another embodiment of the invention, there is provided a method of operating a digital image processing apparatus, the method including steps of (a) calculating information regarding a distance to a subject and face size information; and (b) determining whether the subject is a true subject or not by comparing the obtained information to pre-stored information regarding face sizes according to distances.

The step (a) may include steps of (a-1) adjusting a focus of a live-view image and calculating a distance from the subject to a lens; and (a-2) calculating the size of a face from the live view image with adjusted focus.

In the step (b), it may be determined that the detected face corresponds to a true subject in the case where a stored face size according to a distance and the calculated face size according to the distance are similar to each other, and it may be determined that the detected face is not a true subject in the case where face sizes according to the distances, the face sizes stored in the database are not similar to the calculated face sizes according to the distances.

The method may further include a step of outputting an informing signal to inform that the subject is not a true subject in the case where it is determined that the subject is not a true subject.

The informing signal may be either a pop-up message or a voice message.

BRIEF DESCRIPTION OF THE DRAWINGS

The above and other features and advantages of various embodiments of the invention will become more apparent by describing in detail exemplary embodiments thereof with reference to the attached drawings in which:

FIG. 9 is a flowchart of a method for face determination by using distance information according to another embodiment of the invention.

DETAILED DESCRIPTION OF THE EMBODIMENTS

Figure 1:
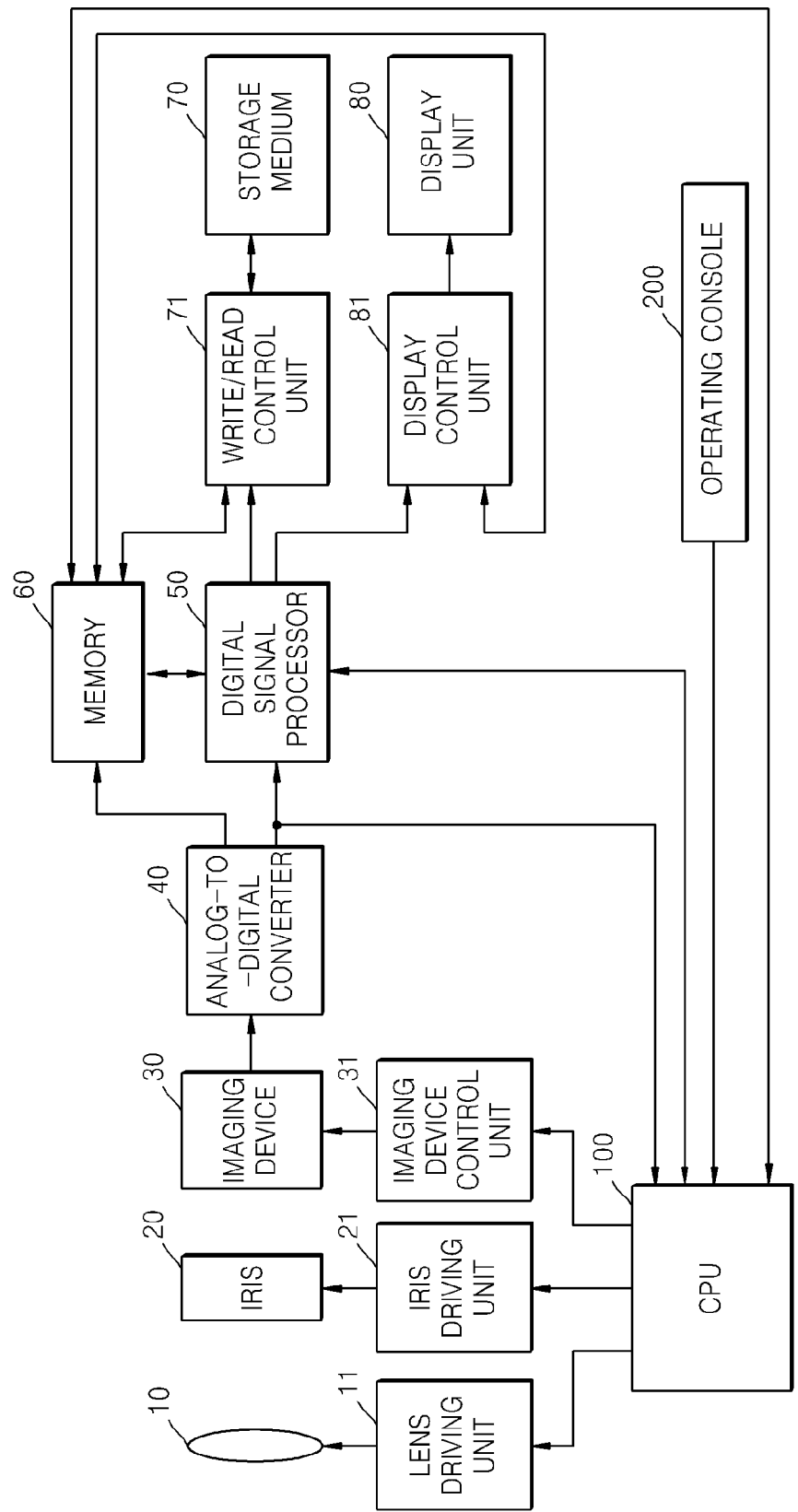
FIG. 1 is a block diagram of a face detecting apparatus according to an embodiment of the invention.

FIG. 1 is a block diagram of a face detecting apparatus according to an embodiment of the invention. More specifically, FIG. 1 roughly illustrates a digital photographing apparatus capable of detecting faces, and hereinafter, the face detecting apparatus will be referred to as a digital photographing apparatus. However, embodiments of the invention are not limited to the digital photographing apparatus shown in FIG. 1. The embodiments of the invention described below and modifications thereof may also be applied to image processing apparatuses including, but not limited to, personal digital assistants (PDAs) and personal multimedia players (PMPs).

A central processing unit (CPU) 100 controls the overall operations of a digital image processing apparatus. Furthermore, the digital image processing apparatus includes an operating console 200, which includes keys via which a user generates electric signals. An electric signal from the operating console 200 is transmitted to the CPU 100, so that the CPU 100 may control the digital image processing apparatus according to the electric signal.

In the case of an image capturing mode, as an electric signal from a user is applied to the CPU 100, the CPU 100 analyzes the electric signal and controls a lens driving unit 11, an iris driving unit 21, and an imaging device control unit 31, and thus the positions of a lens 10, an aperture of an iris 20, and the sensitivity of an imaging device 30 are controlled, respectively. The imaging device 30 generates data from light incident thereto, and an analog-to-digital converter (ADC) 40 converts analog data output by the imaging device 30 into digital data. Here, the ADC 40 may be omitted based on characteristics of the imaging device 30.

Figure 2:
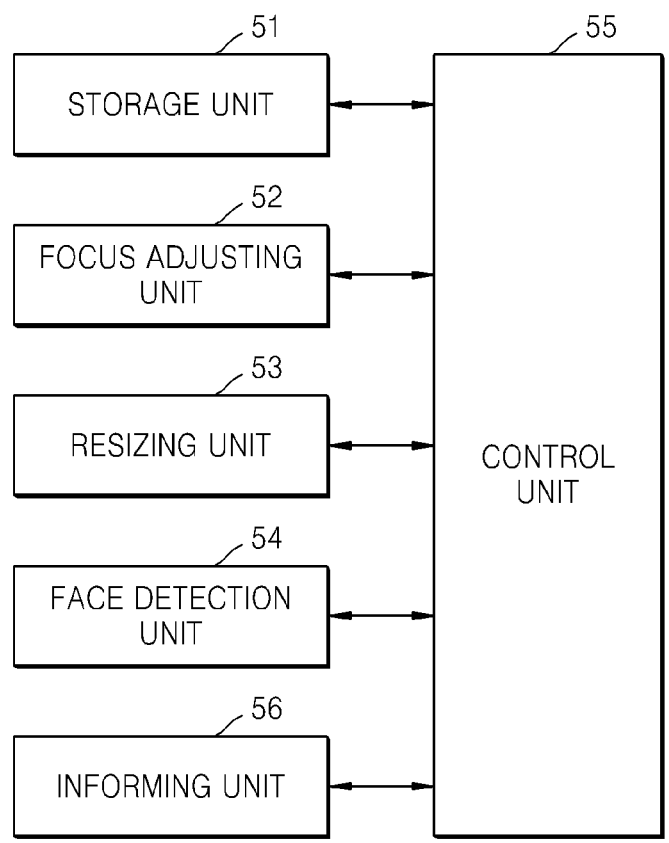
FIG. 2 is a block diagram showing the digital signal processor of FIG. 1 in closer detail.

Data from the imaging device 30 may be input to a digital signal processor (DSP) 50 via a memory 60, may be directly input to the DSP 50, or, if required, may be input to the CPU 100. Here, the memory 60 includes a read-only memory (ROM) or a random access memory (RAM). If required, the DSP 50 may perform image processes, such as gamma correction and white balance adjustment, on data from the imaging device 30. Furthermore, as shown in FIG. 2, the DSP 50 may include a storage unit 51, a focus adjusting unit 52, a resizing unit 53, a face detection unit 54, a control unit 55, and an informing unit 56. Here, various modifications may be made regarding the components; e.g., the storage unit 51, the focus adjusting unit 52, the resizing unit 53, the face detection unit 54, the control unit 55, and the informing unit 56 may be components separate from the DSP 50. The operations of the components above will be described below.

An image from data output by the DSP 50 is transmitted to a display control unit 81 either via the memory 60 or directly. The display control unit 81 controls a display unit 80 to display the image on the display unit 80. Here, the display unit 80 may be a touch-screen. Furthermore, data output by the DSP 50 is input to a write/read control unit 71 either via the memory 60 or directly, and the write/read control unit 71 stores image data in a storage medium 70 either in response to a signal from a user or automatically. Alternatively, the write/read control unit 71 may read data from an image file stored in the storage medium 70 and input the data to the display unit 81 either via the memory 60 or via another route, so that an image is displayed on the display unit 80. The storage medium 70 may either be detachably attached or be permanently attached to a digital image processing unit.

Hereinafter, functions of the DSP 50 will be described with reference to FIG. 2. Two embodiments of the DSP 50 are described below, wherein in the first embodiment, the DSP 50 determines whether a subject is a true subject or not based on distance information regarding a distance to the subject and face length information, and in the second embodiment, the DSP 50 determines whether a subject is a true subject or not based on distance information regarding a distance to the subject and information regarding the size of a face. The first embodiment will be described with reference to FIGS. 2 through 6, and the second embodiment will be described with reference to FIGS. 2, 3, and 8.

First, the operations of the DSP 50 according to the first embodiment will be described.

To determine whether a subject is a true subject or not based on distance information regarding a distance to the subject and face length information, the DSP 50 includes the storage unit 51, the focus adjusting unit 52, the resizing unit 53, the face detection unit 54, the control unit 55 and the informing unit 56.

The storage unit 51 stores at least one of face detection information, a minimum face length reference value (e.g., 250 mm) based on experiments, and a maximum face length reference value (e.g., 400 mm). Various sizes of detected faces are stored in the storage unit 51. For example, the smallest size of a detected face stored therein is 14×14, and face detection fails if the size of a detected face is smaller than the smallest size.

The focus adjusting unit 52 adjusts a focus of a live view image and calculates a distance D between a subject and the lens 10. The focus adjusting unit 52 moves a focus lens (not shown) in a focus adjustment direction according to a first shutter-release button input signal and adjusts a focus by detecting an in-focus position based on a subject image formed on the imaging surface of the imaging device 30 via the lens 10. Here, the focus adjusting unit 52 calculates the distance D between a subject and the lens 10, and, when the first shutter-release signal is input, a light emitting unit (not shown) of a digital photographing apparatus emits infrared light onto a subject by using an infrared light emitting diode (not shown), and a light receiving unit (not shown) receives infrared light, which is emitted by the light emitting unit and reflected by the subject, and a signal corresponding to the light reception and measures the distance D.

A live-view image displayed on the display unit 80 has a resolution of 960×240, for example, is updated every 33 ms, and is displayed on the display unit 80.

In an embodiment, the resizing unit 53 reduces the resolution of a live-view image; e.g., a live-view image having a resolution of 960×240 may be changed to an image having a resolution of 320×240.

The face detection unit 54 detects a face from a resized image, and calculates a face detection starting point (x, y), and the width and the length H (referred hereinafter as face length $H_{image}$) of the face. According to the feature-based face detecting method, the face detection unit 54 detects constant facial features (face parts such as the eyes, nose, and mouth, skin texture, and skin tone) and calculates coordinates of facial feature points. From among various facial features, skin tone is the most frequently used feature, because skin tone is less sensitive with respect to movement, rotation, and changes in a size of a face. Furthermore, according to a template-based face detecting method, the face detection unit 54 creates a plurality of standard patterns regarding faces, and stores the patterns for face detection. Then, the patterns are compared to an image one-by-one within a face browsing window to detect a face. A currently popular face detecting method is a support vector machine (SVM)-based face detecting method. According to the SVM-based face detecting method, a learning apparatus learns faces and non-faces by sub-sampling different regions of an image and detects a face from an input image. The face information detections of the face detection unit 54 are well-known in the art, and thus detailed descriptions thereof will be omitted.

Figure 4:
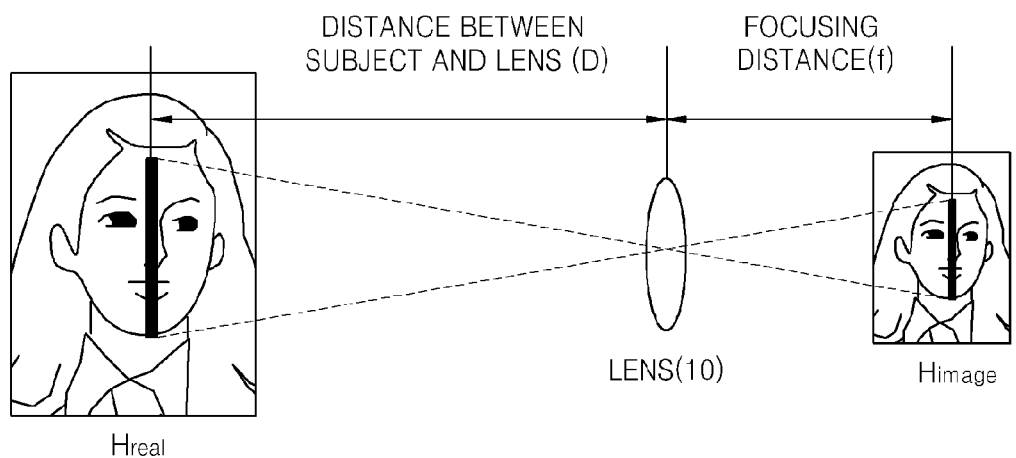
FIG. 4 is a pictorial diagram for describing calculation of actual face length of a subject in FIG. 2.

According to the first embodiment, as shown in FIG. 4, the face detection unit 54 calculates the actual length $H_{real}$ of a subject by using the distance D from the subject to the lens 10, the calculated face length $H_{image}$, and a focusing distance f that are calculated by the focus adjusting unit 52.

Actual Face Length($H_{real}$)=Face Length($H_{image}$)×D/f   [Mathematical Expression 1]

As shown in FIG. 4, the calculation of the actual face length $H_{real}$ may be performed by either the face detection unit 54 or the control unit 55.

The control unit 55 determines whether a subject is a true subject or not by comparing the calculated actual face length $H_{real}$ and face length reference values (a minimum face length reference value (e.g., 250 mm) and a maximum face length reference value (e.g., 400 mm)) stored in the storage unit 51.

Figure 5:
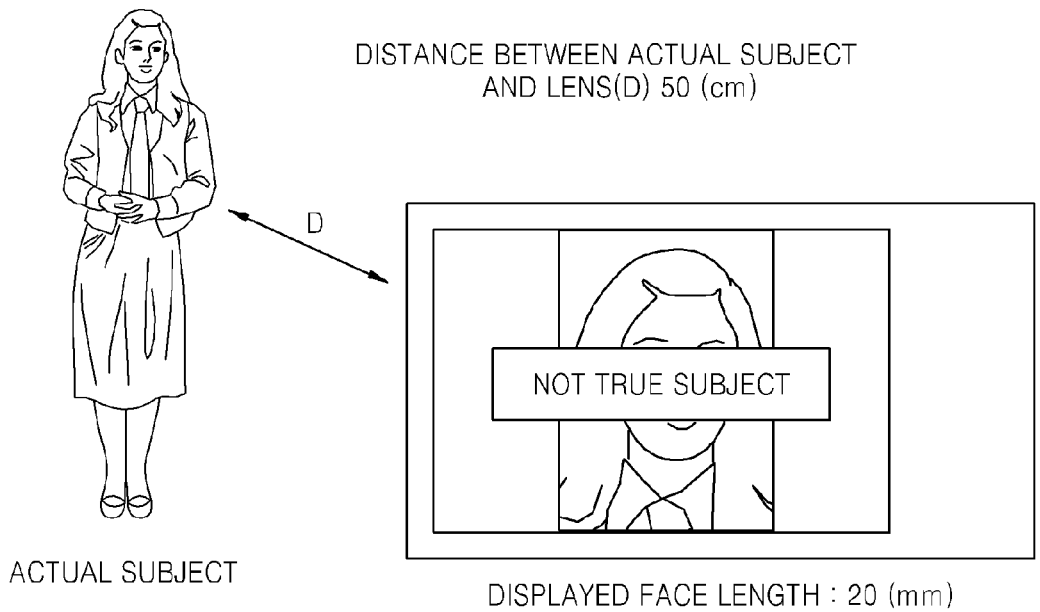
FIG. 5 is a pictorial diagram for describing determination that a face is not a true face, based on the calculation of the actual face length of a subject in FIG. 2.

As shown in FIG. 5, when the distance D between a subject and the lens 10 is 50 cm, the detected face length $H_{image}$ is 20 mm, and the focusing distance f is 50 mm, the calculated actual face length $H_{real}$ is 200 mm according to Mathematical Expression 1. Since the calculated actual face length $H_{real}$, which is 200 mm, is smaller than the minimum face length reference value (e.g., 250 mm) stored in the storage unit 51, the control unit 55 determines that the subject of a displayed image is not a true subject.

In the case where the subject of a displayed image is not a true subject, the control unit 55 outputs a control signal for the informing unit 56 to output an alarm message. According to a control of the control unit 55, the informing unit 56 outputs a message indicating that the subject of the displayed image is not a true subject, wherein the message may be a pop-up message, a voice message, or other text or sound indicator.

Figure 6:
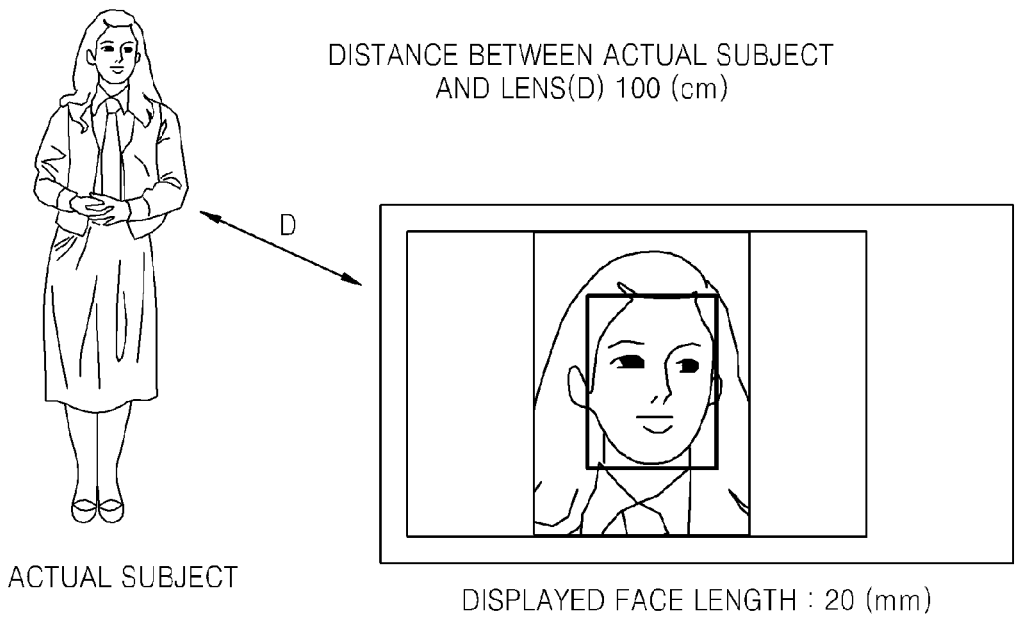
FIG. 6 is a pictorial diagram for describing determination that a face corresponds to a true face, based on the calculation of the actual face length of a subject in FIG. 2.

As shown in FIG. 6, when the distance D between a subject and the lens 10 is 1.0 m, the detected face length $H_{image}$ is 20 mm, the focusing distance f is 70 mm, and the calculated actual face length $H_{real}$ is 285 mm according to Mathematical Expression 1. Since the calculated actual face length $H_{real}$, which is 285 mm, is between the minimum face length reference value (e.g., 250 mm) and the maximum face length reference value (e.g., 400 mm) stored in the storage unit 51, the control unit 55 determines that the subject of a displayed image is a true subject. Then, an image may be captured in response to a second shutter-release button input.

Next, the operations of the DSP 50 according to the second embodiment will be described.

To determine whether a subject is a true subject or not by comparing distance information regarding a distance to the subject and face size information to pre-stored information regarding face sizes according to distances, the DSP 50 includes the storage unit 51, the focus adjusting unit 52, the resizing unit 53, the face detection unit 54, the control unit 55, and the informing unit 56.

The storage unit 51 stores at least one of face detection information and information regarding face sizes according to the distances D from a subject to the lens 10. Various sizes of detected faces are stored in the storage unit 51. For example, the smallest size of detected face stored therein is 14×14, and face detection fails if the size of a detected face is smaller than the smallest size. Furthermore, a size of detected face, in the case where the distance D from a subject to the lens 10 is 30 cm, stored therein is 20×20, for example.

The focus adjusting unit 52 adjusts a focus of a live view image and calculates a distance D between a subject and the lens 10. A detailed description thereof is given above.

The resizing unit 53 reduces the resolution of a live-view image displayed on the display unit 80; e.g., a live-view image having a resolution of 960×240 may be changed to an image having a resolution of 320×240.

The face detection unit 54 detects a face from a resized image, and calculates a face detection starting point (x, y), and the width and the length H (referred hereinafter as face length $H_{image}$) of the face, and then a face size (face width× face length H) is calculated. In an embodiment, the face size calculation may be performed by either the face detection unit 54 or the control unit 55.

Figure 7:
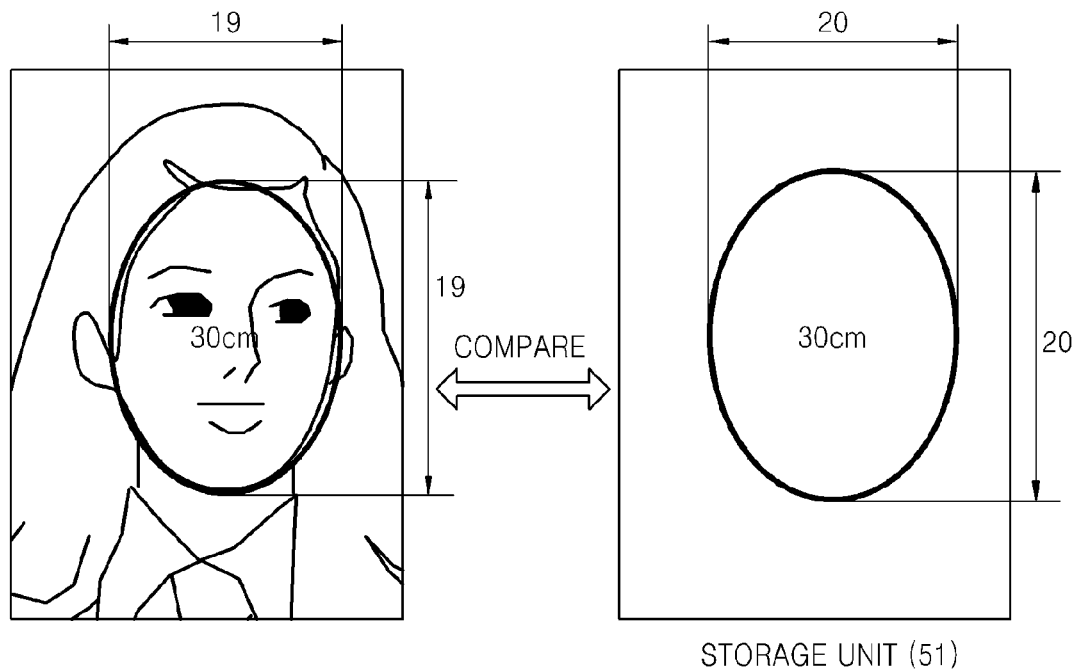
FIG. 7 is a pictorial diagram for describing detection of feature points of a face detected in FIG. 2 and obtainment of distance information regarding the detected face.

The control unit 55 determines whether a subject is a true subject or not by comparing the calculated face size according to the distance D from a subject to the lens 10 and information regarding face sizes according to the distances D from a subject to the lens 10, the information stored in the storage unit 51. As shown in FIG. 7, when the distance D between a subject and the lens 10 is 30 cm, the detected face size is 19×19, and a face size detected in the case where the distance D from a subject to the lens 10 is 30 cm is 20×20 according to information stored in the storage unit 51, for example, the two face sizes are similar to each other, and thus the control unit 55 determines that the subject of a display image is a true subject. However, in the case where a calculated face size according to the distance D from a subject to the lens 10 and face sizes according to the distances D from a subject to the lens 10 according to information stored in the storage unit 51 are not similar to each other, the control unit 55 determines that the subject of a displayed image is not a true subject, and transmits a control signal to the informing unit 56 to output an alarm message. In an embodiment, the size of a detected face is determined to be similar to or correspond to a face size stored in the imaging apparatus if the size of the detected face is within a predetermined range of or equal to the face size stored in the imaging apparatus. According to a control of the control unit 55, the informing unit 56 outputs a message indicating that the subject of the displayed image is not a true subject, wherein the message may be a pop-up message or a voice message.

As described above, erroneous face detecting may be avoided by determining whether a subject is a true subject or not based on distance information regarding a distance to the subject and face detection information.

Figure 8:
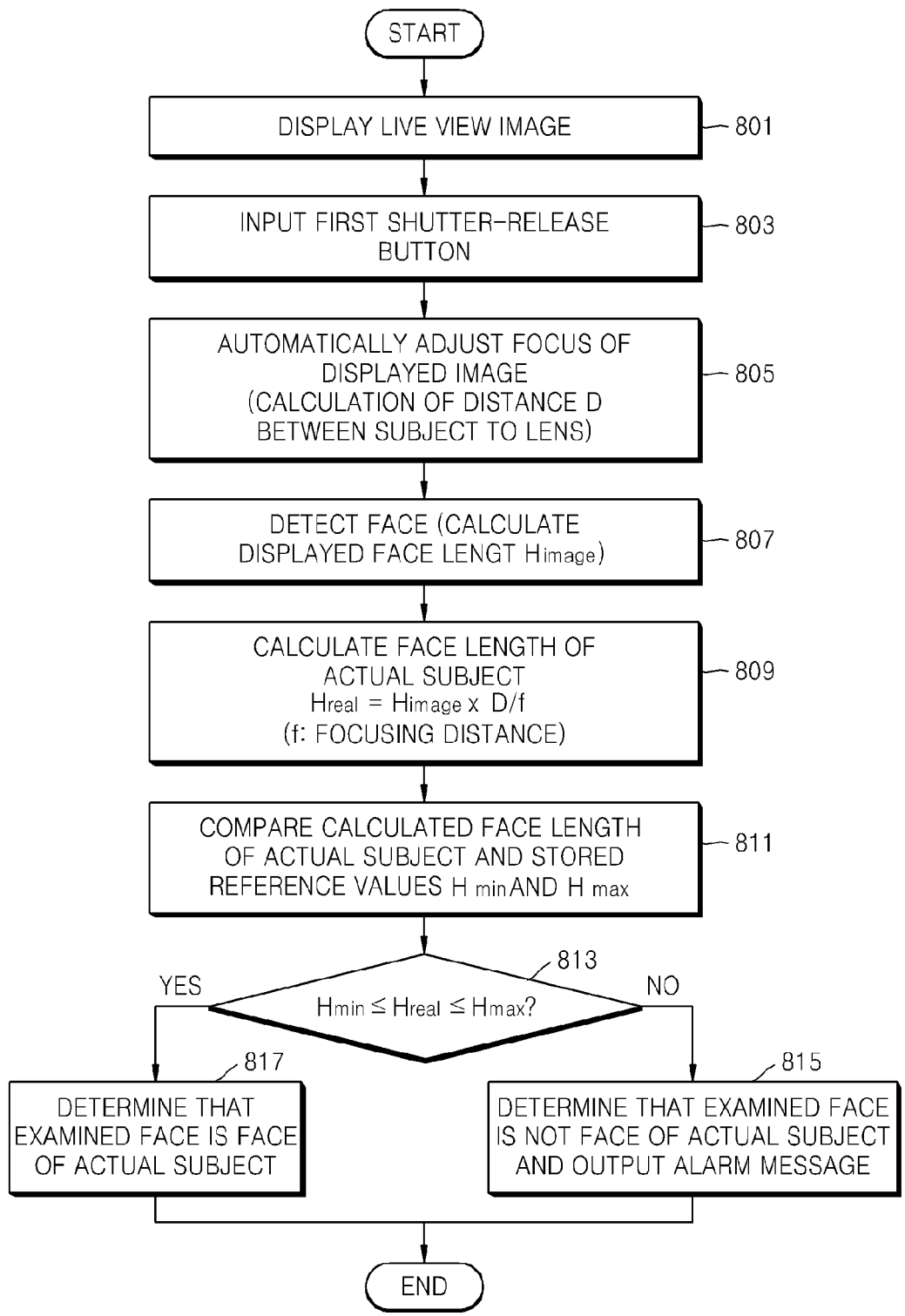
FIG. 8 is a flowchart of a method for face determination by using distance information according to an embodiment of the invention.

Hereinafter, a method of detecting a face according to an embodiment of the invention will be described in detail with reference to FIGS. 8 and 9. The method of detecting a face according to the embodiment of the invention may be performed in the digital image processing apparatus as shown in FIG. 1, wherein, in other embodiments, the main algorithm of the method may be performed in the DSP 50 by using peripheral components in the digital image processing apparatus.

First, referring to FIG. 8, the method of detecting a face according to an embodiment of the invention will be described.

For face detection, the DSP 50 establishes a database (not shown) and stores in the database at least one of each of face detection information, a minimum face length reference value (e.g., 250 mm) based on experiments, and a maximum face length reference value (e.g., 400 mm). Various sizes of detected faces are stored therein. For example, the smallest size of a detected face stored therein is 14×14, and face detection fails if the size of a detected face is smaller than the smallest size. In an embodiment, the foregoing data may be stored in a data structure other than a database.

When a user turns on a digital image processing apparatus, the DSP 50 displays a live view image on the display unit 80 (operation 801). A live-view image displayed on the display unit 80 has a resolution of 960×240, for example. Also, in an embodiment, the live-view image is updated every 33 ms while being displayed on the display unit 80.

When a first shutter-release button is input (operation 803), the DSP 50 automatically adjusts a focus of the displayed image (operation 805). The DSP 50 adjusts a focus of a live view image and calculates a distance D between a subject and the lens 10. Detailed descriptions regarding the focus adjustment and the calculation of the distance D between a subject and the lens 10 are given above.

After the focus adjustment and the calculation of the distance D between a subject and the lens 10 are completed, the DSP 50 detects a face from a live view image with adjusted focus (operation 807).

Figure 3:
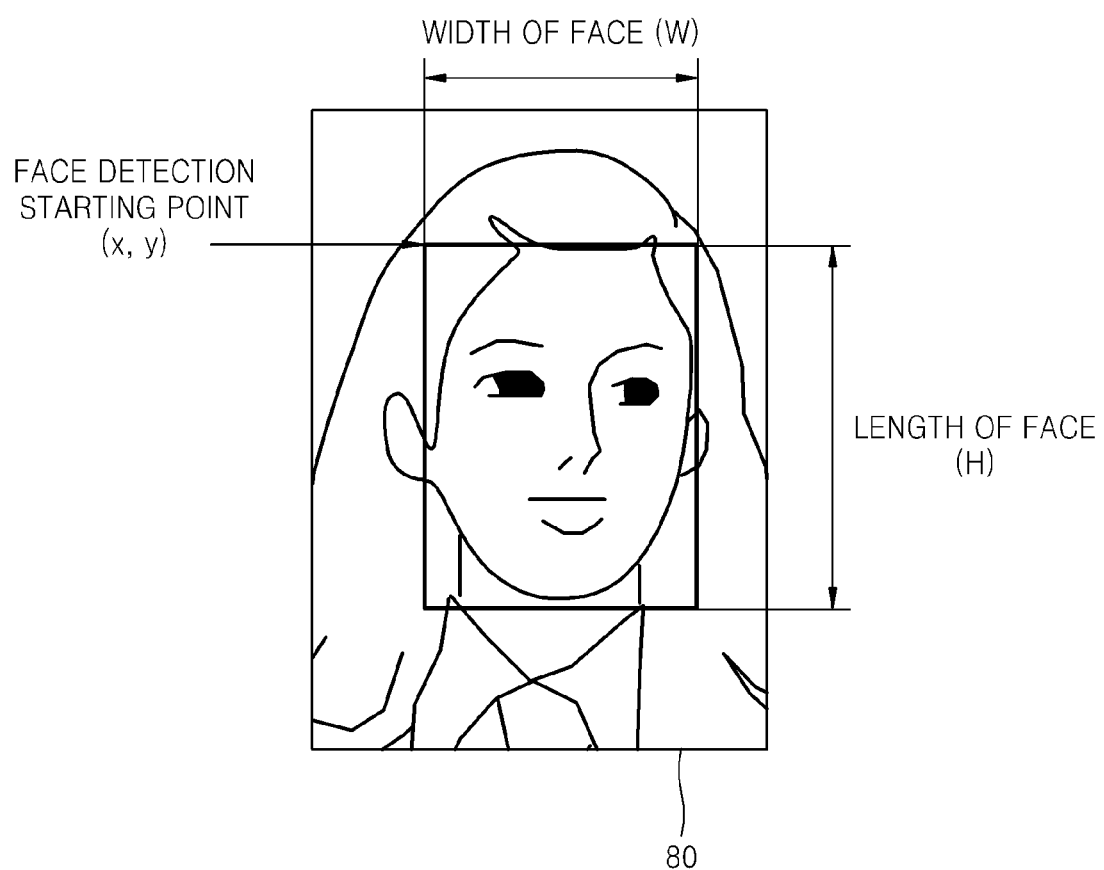
FIG. 3 is a pictorial diagram for describing face length calculation base on face detection in FIG. 2.

The DSP 50 reduces the resolution of a live-view image for face detection; e.g., a live-view image having a resolution of 960×240 may be changed to an image having a resolution of 320×240. Next, DSP 50 detects a face from a resized image, and calculates a face detection starting point (x, y), and the width and the length H (referred hereinafter as face length $H_{image}$) of the face, as shown in FIG. 3. Next, as shown in FIG. 4, the DSP 50 calculates the actual length $H_{real}$ of a subject by using the distance D from the subject to the lens 10, the calculated face length $H_{image}$, and the focusing distance f that are calculated by the focus adjusting unit 52 (operation 809), where the actual face length $H_{real}$ is calculated according to Mathematical Expression 1.

After the calculation of the actual face length $H_{real}$, the DSP 50 determines whether a subject is a true subject or not by comparing the calculated actual face length $H_{real}$ and face length reference values (a minimum face length reference value (e.g., 250 mm) and a maximum face length reference value (e.g., 400 mm)) stored in the database (operations 811 and 813).

As shown in FIG. 5, since the calculated actual face length $H_{real}$, which is 200 mm, is smaller than the minimum face length reference value (e.g., 250 mm) stored in the database, the control unit 55 determines that the subject of a displayed image is not a true subject, and outputs a message indicating that the subject of the displayed image is not a true subject, wherein the message may be a pop-up message or a voice message (operation 815).

As shown in FIG. 6, since the calculated actual face length $H_{real}$, which is 285 mm, is between the minimum face length reference value (e.g., 250 mm) and the maximum face length reference value (e.g., 400 mm) stored in the database, the DSP 50 determines that the subject of a displayed image is a true subject (operation 817). Then, an image may be captured in response to a second shutter-release button input.

Next, referring to FIG. 9, a method of detecting a face according to another embodiment of the invention will be described.

For face detection, the DSP 50 establishes a database (not shown) and stores in the database at least one of face detection information and information regarding face sizes according to the distances D from a subject to the lens 10. Various sizes of detected faces are stored in the database. For example, the smallest size of a detected face stored therein is 14×14, and in an embodiment, face detection fails if the size of a detected face is smaller than the smallest size. Furthermore, a size of a detected face, in the case where the distance D from a subject to the lens 10 is 30 cm, stored therein is 20×20, for example.

When a user turns on a digital image processing apparatus, the DSP 50 displays a live view image on the display unit 80 (operation 901). A live-view image displayed on the display unit 80 has a resolution of 960×240, for example. Also, the live-view image is updated every 33 ms while being displayed on the display unit 80.

When a first shutter-release button is input (operation 903), the DSP 50 automatically adjusts a focus of the displayed image (operation 905). The DSP 50 adjusts a focus of a live view image and calculates a distance D between a subject and the lens 10. Detailed descriptions regarding the focus adjustment and the calculation of the distance D between a subject and the lens 10 are given above.

After the focus adjustment and the calculation of the distance D between a subject and the lens 10 are completed, the DSP 50 detects a face from a live view image with adjusted focus (operation 907). The DSP 50 reduces the resolution of a live-view image for face detection; e.g., a live-view image having a resolution of 960×240 may be changed to an image having a resolution of 320×240. Next, the DSP 50 detects a face from a resized image, calculates a face detection starting point (x, y), and the width and the length H (referred hereinafter as face length $H_{image}$) of the face, as shown in FIG. 3, and then calculates a face size (face width×face length H)

Next, the DSP 50 compares the calculated face size according to the distance D from a subject to the lens 10 and information regarding face sizes according to the distances D from a subject to the lens 10 stored in the database, and then determines whether they are similar to each other or not (operations 909 and 911).

As shown in FIG. 7, when the distance D between a subject and the lens 10 is 30 cm and the detected face size is 19×19 and a face size detected, in the case where the distance D from a subject to the lens 10 is 30 cm, is 20×20 according to information stored in the database, for example, the two face sizes are similar to each other, and thus the DSP 50 determines that the subject of a display image is a true subject (operation 913).

However, in the case where a calculated face size according to the distance D from a subject to the lens 10 and face sizes according to the distances D from a subject to the lens 10 according to information stored in the database are not similar to each other, the DSP 50 determines that the subject of a displayed image is not a true subject, and outputs a message indicating that the subject of the displayed image is not a true subject, wherein the message may be a pop-up message or a voice message (operation 915).

As described above, according to embodiments of the invention, it is determined whether a subject is a true subject or not based on distance information regarding a distance to the subject and face detection information. Therefore, erroneous face detections may be reduced.

For the purposes of promoting an understanding of the principles of the invention, reference has been made to the preferred embodiments illustrated in the drawings, and specific language has been used to describe these embodiments. However, no limitation of the scope of the invention is intended by this specific language, and the invention should be construed to encompass all embodiments that would normally occur to one of ordinary skill in the art.

While various embodiments of the invention are described in terms of functional block components, such functional blocks may be realized by any number of hardware and/or software components configured to perform the specified functions. For example, embodiments of the invention may employ various integrated circuit components, processing elements, logic elements, etc.

The particular implementations shown and described herein are illustrative examples of the invention and are not intended to otherwise limit the scope of the invention in any way. The connecting lines, or connectors shown in the various figures presented are intended to represent exemplary functional relationships and/or physical or logical couplings between the various elements. It should be noted that many alternative or additional functional relationships, physical connections or logical connections may be present in a practical device. Moreover, no item or component is essential to the practice of the invention unless the element is specifically described as "essential" or "critical".

The use of the terms "a" and "an" and "the" and similar referents in the context of describing the invention (especially in the context of the following claims) are to be construed to cover both the singular and the plural. Furthermore, recitation of ranges of values herein are merely intended to serve as a shorthand method of referring individually to each separate value falling within the range, unless otherwise indicated herein, and each separate value is incorporated into the specification as if it were individually recited herein. Finally, the steps of all methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed.

While the invention has been particularly shown and described with reference to exemplary embodiments thereof, it will be understood by those of ordinary skill in the art that various changes in form and details may be made therein without departing from the spirit and scope of the invention as defined by the following claims.

What is claimed is:

1. A face detecting apparatus for detecting a face of a subject in an image comprising:
    a digital signal processor for determining if the subject is a true subject based on distance information regarding a distance to the subject and face length information,
    wherein the digital signal processor comprises:
    a focus adjusting unit for adjusting a focus of a live view image and calculating a distance between the subject and a lens;
    a face detection unit for detecting a face from the live view image with adjusted focus, calculating a displayed face length of the detected face, and calculating an actual face length of the detected face based on a distance between the subject and the lens, the calculated displayed face length, and a focusing distance; and
    a control unit for determining if the subject is a true subject by comparing the calculated actual face length of the face and a pre-stored face length reference value.

2. The face detecting apparatus of claim 1, further comprising a storage unit for storing at least one of face detection information, a minimum face length reference value based on experiments, and a maximum face length reference value.

3. The face detecting apparatus of claim 2, further comprising an informing unit for outputting an informing signal indicating that the subject is not a true subject if it is determined that the subject is not a true subject based on the comparison.

4. The face detecting apparatus of claim 3, wherein the informing signal is one of a pop-up message and a voice message.

5. A face detecting apparatus for detecting a face of a subject in an image comprising:
    a digital signal processor for determining if the subject is a true subject by comparing distance information regarding a distance to the subject and face size information regarding the subject to pre-stored distance information and face size information,
    wherein the digital signal processor comprises:
    a storage unit for storing at least one of face detection information and information regarding face sizes according to the distances;
    a focus adjusting unit for adjusting a focus of a live view image and calculating a distance between the subject and a lens;
    a face detection unit for detecting a face in the live view image and calculating the size of the face with adjusted focus; and
    a control unit for determining if the detected face corresponds to a true subject by comparing the calculated face size of the detected face to a pre-stored face size according to distance.

6. The face detecting apparatus of claim 5, further comprising an informing unit for outputting an informing signal indicating that the subject is not a true subject if it is determined that the subject is not a true subject based on the comparison.

7. The face detecting apparatus of claim 6, wherein the informing signal is one of a pop-up message and a voice message.

8. A method of operating a digital image processing apparatus, the method comprising steps of:
    (a) calculating by a processor of the digital image processing apparatus information regarding a distance to a subject and face length information; and (b) determining by said processor if the subject is a true subject by using the calculated information
wherein (a) and (b) comprises steps of:
(a-1) calculating a distance from the subject to a lens;
(a-2) detecting a face from a live view image and calculating the length of the detected face;
(a-3) calculating an actual face length by using the distance from the subject to the lens, the calculated face length, and a focusing distance and temporarily storing the result in a storage device for comparison;
(b-1) comparing the calculated actual face length and at least one of a pre-stored minimum face length reference value and a pre-stored maximum face length reference value; and
(b-2) determining if the subject is a true subject based on the comparison and sending an electronic signal to the informing unit.

9. The method of claim 8, further comprising a step of outputting an informing signal to inform that the subject is not a true subject if the subject is not a true subject.

10. The method of claim 9, wherein the informing signal is one of a pop-up message and a voice message.

11. The method of claim 8, further comprising capturing by the digital image processing apparatus an image of a subject in a portrait mode when the electronic signal indicates that the subject is a true subject and in a non-portrait mode when the electronic signal indicates that the subject is not a true subject.

12. A method of operating a digital image processing apparatus, the method comprising steps of:
(a) calculating by a processor of the digital image processing apparatus information regarding a distance to a subject and face size information; and
(b) determining by said processor if the subject is a true subject by comparing the calculated information to pre-stored information regarding face sizes according to distances,
wherein (a) and (b) comprises steps of:
(a-1) adjusting a focus of a live view image and calculating a distance from the subject to a lens;
(a-2) detecting a face from the live view image;
(a-3) calculating the size of the face from the live view image with adjusted focus and temporarily storing the result in a storage device for comparison;
(b-1) determining that the detected face corresponds to a true subject if a stored face size according to a distance corresponds to the calculated face size according to the distance; and
(b-2) determining that the detected face is not a true subject in the case where the calculated face size does not correspond to a face size stored in the database according to the distance and sending an electronic signal to the informing unit.

13. The method of claim 12, further comprising a step of outputting an informing signal to inform that the subject is not a true subject if the subject is not a true subject.

14. The method of claim 13, wherein the informing signal is one of a pop-up message and a voice message.

15. The method of claim 12, further comprising capturing by the digital image processing apparatus an image of a subject in a portrait mode when the electronic signal indicates that the subject is a true subject and in a non-portrait mode when the electronic signal indicates that the subject is not a true subject.

* * * * *

UNITED STATES PATENT AND TRADEMARK OFFICE
CERTIFICATE OF CORRECTION

PATENT NO. : 8,582,892 B2  
APPLICATION NO. : 12/880309  
DATED : November 12, 2013  
INVENTOR(S) : Isaac Lee, Seung-yun Lee and Byoung-kwon Lee It is certified that error appears in the above-identified patent and that said Letters Patent is hereby corrected as shown below:

ON THE TITLE PAGE:

In (75) Inventors, replace "Seung-yun Lee, Hwaseongi-si (KR)" with

--Seung-yun Lee, Hwaseong-si (KR)--

Signed and Sealed this
Seventh Day of October, 2014

Michelle K. Lee
*Deputy Director of the United States Patent and Trademark Office*